United States Patent
Park

(10) Patent No.: US 8,598,750 B2
(45) Date of Patent: Dec. 3, 2013

(54) BROADBAND LINEAR VIBRATOR AND MOBILE TERMINAL

(75) Inventor: Youngil Park, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 362 days.

(21) Appl. No.: 12/984,059

(22) Filed: Jan. 4, 2011

(65) Prior Publication Data

US 2011/0254782 A1  Oct. 20, 2011

(30) Foreign Application Priority Data

Apr. 16, 2010 (KR) .................. 10-2010-0035434
Apr. 16, 2010 (KR) .................. 10-2010-0035436

(51) Int. Cl.
*H02K 33/00* (2006.01)

(52) U.S. Cl.
USPC ............. 310/25; 310/15; 340/407.1; 381/417

(58) Field of Classification Search
USPC ........... 310/14, 15, 20, 25, 36, 81; 340/407.1; 381/417, 420–422
See application file for complete search history.

(56) References Cited

U.S. PATENT DOCUMENTS

| 5,861,686 A * | 1/1999 | Lee ................................. 310/36 |
| 6,590,991 B1 * | 7/2003 | Maeda .......................... 381/409 |
| 7,106,878 B2 * | 9/2006 | Saiki et al. .................... 381/396 |

* cited by examiner

Primary Examiner — Dang Le
(74) Attorney, Agent, or Firm — Saliwanchik, Lloyd & Eisenschenk

(57) ABSTRACT

A broadband linear vibrator that is small sized and yet capable of generating a greater vibrating force and outputting various broadband vibrations, and a mobile terminal capable of outputting various vibrations and sounds, wherein the broadband linear vibrator includes a case; a spring coupled to the case; an oscillator including a magnet for elastically supporting the spring and a stator formed inside the case for vibrating the oscillator, wherein a frequency band to a maximum use frequency that is detectable as a vibration or a sound source based on a resonant frequency is 1.2 times than a frequency band to a minimum use frequency, such that various feelings of vibrations and sounds can be advantageously provided by the broadband linear vibrator.

7 Claims, 3 Drawing Sheets

BROADBAND LINEAR VIBRATOR AND MOBILE TERMINAL

CROSS-REFERENCE TO RELATED APPLICATIONS

This application claims the benefit under 35 U.S.C. §119 of Korean Application Nos. 10-2010-0035434 and 10-2010-0035436, filed Apr. 16, 2010, which are incorporated by reference in their entirety.

BACKGROUND OF THE DISCLOSURE

Field of the Invention

The present disclosure relates to a linear vibrator, and more particularly to a broadband linear vibrator that is small sized and yet capable of generating a greater vibrating force and outputting various vibrations in broadband, and a mobile terminal capable of outputting various vibrations and sounds.

Generally, a linear vibrator is utilized to generate vibration to, for example, a mobile terminal by using electromagnetic force generated between a magnet and a coil. Particularly, as demand is on the increase for tactility, the linear vibrator is variably used for haptic devices. Furthermore, as devices using vibrators have been recently diversified and miniaturized, demand for a small-sized linear vibrator capable of generating a large amount of vibrations is on the increase.

FIG. 1 is a lateral cross-sectional view of a related art linear vibrator.

Referring to FIG. 1, a coil 10 is secured at a central bottom of a vibrator for generating electromagnetic force by being applied with a current. A vibrating unit 20 is connected to a case 40 by a spring 30 having elasticity. The vibrating unit 20 includes a weight 22 having a predetermined mass coupled to a yoke 21, and a magnet 23 about the yoke 21 having a magnetic property, where the yoke 21 is wrapped and discrete from the coil 10 when viewed from an upper side of the vibrating unit.

In a case a current flows in the coil 10, the vibrating unit 20 is activated by electromagnetic force generated by the coil 10 and the magnet 23, and an entire body of the vibrating unit 20 starts to vertically vibrate in association with the elasticity of the spring 30.

However, the related art linear vibrator suffers from a disadvantage in that vibration can be felt in the vicinity of resonant frequency. FIG. 2 shows experimental values of vibrations and moving distance responsive to vibration frequency.

A left hand side graph of FIG. 2 shows a maximum moving distance given in mm, and a right hand side graph illustrates a G value of vibration given in root mean square.

The vibrating unit of a related art linear vibrator is comprised of one resonant frequency within a bandwidth of 100~300 Hz. The vibration can be felt within a restricted scope of the resonant frequency with a moving distance and amount of vibrations reaching the peak values. Generally, the amount of vibration felt in a haptic device is 0.2 G or above, and in view of the measured data in the graphs, an amount of vibration that can be felt by a man is generated in the range of 190 Hz to 10 Hz.

Meanwhile, a frequency band detectable by a man in a vibration or a sound is in the range of 20 Hz to 20,000 Hz. A small-sized linear vibrator is used to provide tactility to a button of a touch screen in a mobile terminal using the haptic device. The linear vibrator needs a member such as a weight for increasing vibrating power to compensate the limit of vibrating power. In most cases, due to limit in amplitude and vibrating power of the linear vibrator, a peak value in the resonant frequency is used to solve the vibrating power involved in the linear vibrator. Therefore, as illustrated in FIG. 2, a vibrating power is generated from a considerably limited area.

A man cannot detect a fine frequency difference in the range of 10 Hz of the resonant frequency band, whereby a haptic device is subject to vibration of almost same feeling. Therefore, the related art linear vibrator suffers from disadvantages in that various vibrating feelings cannot be implemented due to a considerably limited frequency variation in the range of 10 Hz when a touch is executed on a touch screen.

In a case a band is to be broadened to generate a vibrating power exceeding approximately 0.2 G that is detectable by a man, i.e., a frequency band actually useable for generating various vibrations to solve the aforementioned problems, vibrations must be generated in a broad range of a resonant frequency. However, the related art linear vibrator suffers from disadvantages in that vibration must be implemented within a narrow range of resonant frequency due to restricted size and vibrating power.

BRIEF SUMMARY

An object of the invention is to solve at least one or more of the above problems and/or disadvantages in a whole or in part and to provide at least the advantages described hereinafter by providing a linear vibrator configured to have a high vibrating power in a broadband, and capable of generating vibrations in a wide scope of bands in addition to resonant frequency, whereby various vibrations can be detected.

Another object is to provide a linear vibrator capable of outputting various vibrations and sounds through a structure configured to have a high vibrating power.

Still another object is to provide a linear vibrator capable of outputting various vibrations and sounds in a mobile terminal using haptic technology, whereby a user satisfaction can be maximized.

In one general aspect of the present disclosure, there is provided a broadband linear vibrator, comprising: a case; a spring coupled to the case; an oscillator including a magnet for elastically supporting the spring and a stator formed inside the case for vibrating the oscillator, wherein a frequency band to a maximum use frequency that is detectable as a vibration or a sound source based on a resonant frequency is 1.2 times than a frequency band to a minimum use frequency.

Therefore, the advantage is that various feelings can be provided by the broadband linear vibrator In some exemplary embodiments of the present disclosure, the broadband linear vibrator may further comprise an upper plate formed between the spring and the magnet, wherein the magnet may include an outer magnet disposed at a periphery of the upper plate and an inner magnet that is centrally disposed.

Therefore, the advantage is that sufficient vibrating power can be provided in a wide frequency band by the broadband linear vibrator.

In some exemplary embodiments of the present disclosure, the broadband linear vibrator may further comprise a bottom plate formed at a bottom end of the magnet.

In some exemplary embodiments of the present disclosure, at least one of the upper plate and the bottom plate may be formed with a magnetic substance.

In some exemplary embodiments of the present disclosure, each of the outer magnet and the inner magnet may have an opposite polarity toward a vibrating direction of the oscillator.

In some exemplary embodiments of the present disclosure, a cubic rate between the outer magnet and the inner magnet may be in the range of 0.8~1.

In some exemplary embodiments of the present disclosure, the broadband linear vibrator may set up a use frequency band from which a vibration mode and a sound mode are respectively set up.

Therefore, the advantage is that vibration and sound can be simultaneously outputted from a single linear vibrator.

In some exemplary embodiments of the present disclosure, the vibration mode may be set up within the maximum use frequency of 300 Hz.

In another general aspect of the present disclosure, there is provided a broadband linear vibrator, comprising: a case; a spring coupled to the case; an oscillator including a magnet for elastically supporting the spring and a stator formed inside the case for vibrating the oscillator, wherein the linear vibrator generates an oscillating frequency capable of detecting in the range of 30~150 Hz before and after resonant frequency.

In some exemplary embodiments of the present disclosure, the broadband linear vibrator may further comprise an upper plate formed between the spring and the magnet, wherein the magnet may include an outer magnet disposed at a periphery of the upper plate and an inner magnet that is centrally disposed.

In some exemplary embodiments of the present disclosure, the broadband linear vibrator may further comprise a bottom plate formed at a bottom end of the magnet.

In some exemplary embodiments of the present disclosure, at least one of the upper plate and the bottom plate may be formed with a magnetic substance.

In some exemplary embodiments of the present disclosure, each of the outer magnet and the inner magnet may have an opposite polarity toward a vibrating direction of the oscillator.

In some exemplary embodiments of the present disclosure, a cubic rate between the outer magnet and the inner magnet may be in the range of 0.8~1.

In still another general aspect of the present disclosure, there is provided a mobile device, comprising: a display outputting an image; a touch pad receiving an execution command through a touch; and a linear vibrator outputting various vibrations and sounds having various frequencies, wherein a frequency band to a maximum use frequency based on a resonant frequency is 1.2 times than a frequency band to a minimum use frequency.

In some exemplary embodiments of the present disclosure, the mobile device may further comprise a controller capable of setting up a vibration mode and a sound mode at the linear vibrator.

In some exemplary embodiments of the present disclosure, the vibration mode may be set up within the use frequency of 300 Hz.

In some exemplary embodiments of the present disclosure, the linear vibrator may simultaneously output a vibration and a sound.

In still further general aspect of the present disclosure, there is provided a mobile device, comprising: a display outputting an image; a touch pad receiving an execution command through a touch; and a linear vibrator outputting various vibrations and sounds having various frequencies, wherein the linear vibrator generates an oscillating frequency capable of detecting in the range of 30~150 Hz before and after a resonant frequency.

The broadband linear vibrator according to the present disclosure is advantageous in that the vibration band is conspicuously broadened compared to the related art linear vibrator, whereby user-detectable frequency scope is broadened to enable an experience of various types of vibrations.

Another advantage is that the linear vibrator capable of outputting various vibrations and sounds is provided through a structure configured to have a high vibrating power in a limited size.

Still another advantage is that vibration and sound can be simultaneously outputted from a single linear vibrator using the haptic method.

Still further advantage is that the mobile device can utilize the vibration and sound at the same time to enable a simplification and miniaturization thereof.

Additional advantages, objects, and features of the disclosure will be set forth in part in the description which follows and in part will become apparent to those having ordinary skill in the art upon examination of the following or may be learned from practice of the disclosure. The objects and advantages of the disclosure may be realized and attained as particularly pointed out in the appended claims.

DETAILED DESCRIPTION

A linear vibrator according to an exemplary embodiment of the present disclosure will be described in detail with reference to the accompanying drawings.

Figure 3:
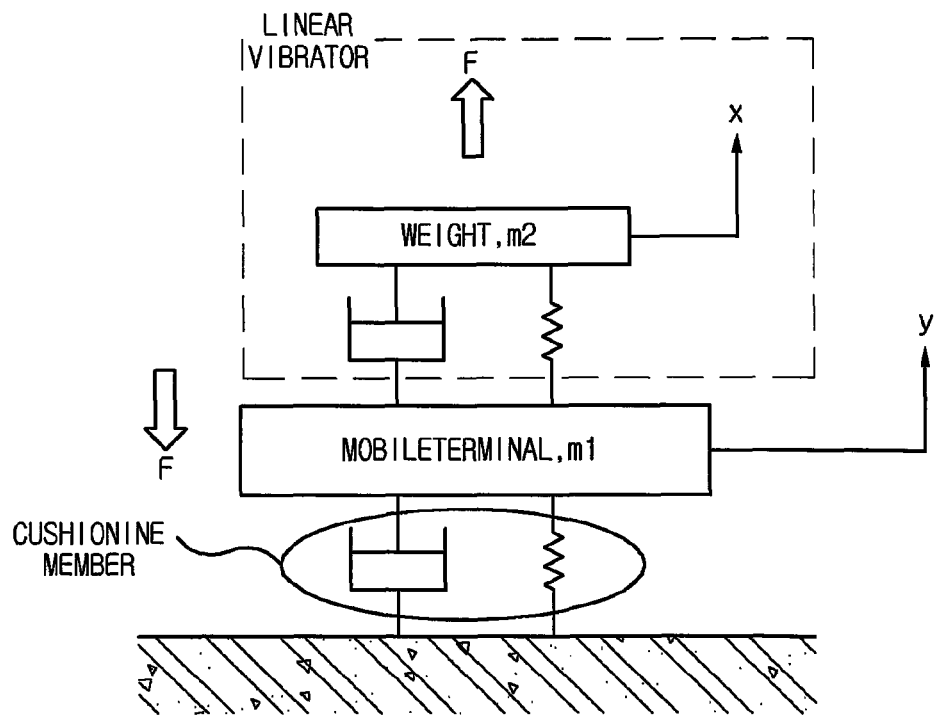
FIG. 3 is a schematic view modeling a two-degree of freedom system of a linear vibrator.

FIG. 3 is a schematic view illustrating a two-degree of freedom system of a linear vibrator, where m1 is a mass of a mobile device including a mobile terminal or a touch liquid crystal, $m^2$ is a mass of an oscillator, c is a damping coefficient, k is an elastic modulus. The vibrator is generally embedded in a device, where a vibrator, a device such as mobile terminal and a cushioning device are illustrated from an upper end of a two-degree of freedom system.

The two-degree of freedom system may be defined by the following equation 1.

$$M\begin{bmatrix}\ddot{x}\\\ddot{y}\end{bmatrix}+C\begin{bmatrix}\dot{x}\\\dot{y}\end{bmatrix}+K\begin{bmatrix}x\\y\end{bmatrix}=\begin{bmatrix}F\\-F\end{bmatrix}, F=F_0\sin\omega t$$

where $M=\begin{bmatrix}m_2 & 0\\0 & m_1\end{bmatrix}, C=\begin{bmatrix}c_2 & -c_2\\-c_2 & c_1+c_2\end{bmatrix},$ $K=\begin{bmatrix}k_2 & -k_2\\-k_2 & k_1+k_2\end{bmatrix}$ $x=Xe^{j\omega t}, y=Ye^{j\omega t}$ $\begin{bmatrix}X\\Y\end{bmatrix}=A^{-1}\begin{bmatrix}F_0\\-F_0\end{bmatrix},$ where A is the system matrix where, x and y represent a deviation of a vibrator and a deviation of a mobile terminal, matrix A defines an entire matrix of the system, F value is a power that is vibrated by the electromagnetic force, and where the F valve is related to a weight, a moving distance and each frequency, which can be simply expressed in the following equation.

$$F = md\omega^2$$

where, m is a mass, d is a moving distance and ω (2πf) represent each frequency, and where the force is proportion to mass and moving distance, and in proportion to square of each frequency.

Therefore, the present disclosure proposes a concept in which a vibrator can vibrate in a broad up and down scope based on resonant frequency.

That is, the related art linear vibrator can generate a vibration that is detectable within a limited scope of resonant frequency, such that in order to broaden detectable vibration range, the resonant frequency is set up at a lower frequency of the use frequency range in which detectable vibration is really generated.

The resonant frequency relates to a mass and rigidity of an entire system, such that the resonant frequency may be set up by changing the mass and rigidity. The resonant frequency band in the present disclosure is preferably determined in the range of 80~180 Hz. In a case the range of use frequency is used at a range higher than the resonant frequency, whereby vibration can be generated at a broader scope. However, in a case vibration is generated at a range deviated from the resonant frequency, there remains a structural subject to be solved which is to be discussed later, in which detectable vibrating force can be generated as described in the related art.

Meanwhile, it should be noted that the concept of resonant frequency being set up at a lower level than that of a useable frequency is not the concept of detectable vibration being generated at a level below the resonant frequency. That is, referring to FIG. 2, a peak value is shown at the resonant frequency and vibrating force is suddenly reduced before and after the resonant frequency in the related art. Due to this reason, the vibration detectable before and after the considerably limited area is generated, which is already noted in the foregoing.

However, even if the resonant frequency is arranged before the use frequency, a graph of the experimental value that shows a relationship between frequency and vibration force draws a slow curve, such that a predetermined scope before the resonant frequency can generate a substantially sufficient detectable vibration. Therefore, preferably, the resonant frequency is set up at a low frequency in the use frequency range that is substantially detectable.

Figure 1:
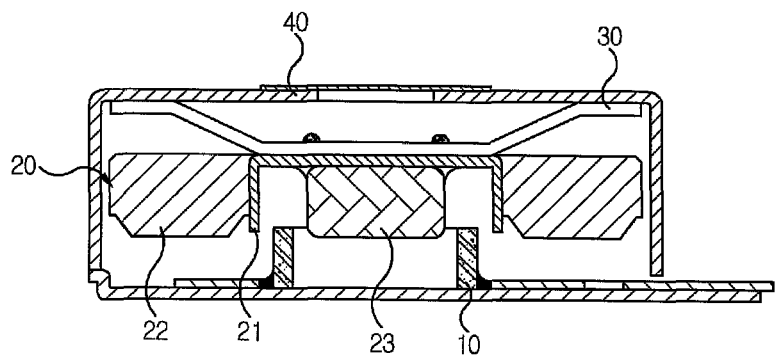
FIG. 1 is a lateral cross-sectional view of a related art linear vibrator.
Figure 2:
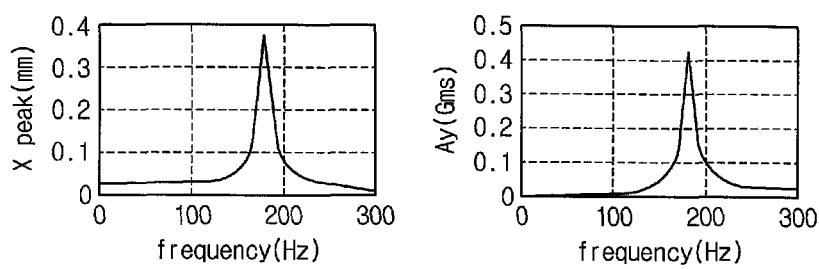
FIG. 2 is a graph illustrating a relationship between frequency of a linear vibrator, a distance of an oscillator and vibrating power according to a related art.

Based on the above-mentioned concept, a concept is suggested where the frequency band to the maximum use frequency detectable as vibration or sound based on resonant frequency is broader than the frequency band to the minimum use frequency, In view of this point of view, referring to FIG. 2 that illustrates an experimental data of the related art linear vibrator, it can be easily noticed that a difference of scope that generates vibration detectable based on the resonant frequency showing a peak value is not that great.

Meanwhile, in the linear vibrator according to the present disclosure, it should be noted that a high band is broader than a low band based on the resonant frequency. Preferably, a frequency band to a maximum use frequency based on a resonant frequency is 1.2 times than a frequency band to a minimum use frequency.

For example, if the resonant frequency is 140 Hz and the minimum frequency at the use frequency is 30 Hz, the maximum frequency is set up at 272 Hz to allow the bandwidth of use frequency of the linear vibrator to be set up from 30 Hz to 272 Hz, whereby various vibrations can be generated in most of areas of detectable vibrations.

Therefore, a linear vibrator oscillating the vibration frequency detectable in the range of 30 Hz to 150 Hz in frequencies before and after the resonant frequency can be provided. It should be apparent that the use frequency band may be set up at a further broader range capable of providing the sound.

Meanwhile, in order to generate vibrations detectable at a band higher than the resonant frequency band, a force, i.e., F value, capable of moving the oscillator must be set up at a greater value. Preferably, a concept may be proposed in which the linear vibrator according to the present disclosure is configured in such a manner that the related art weight is replaced by a magnet, whereby vibrating force of the oscillator can be further enhanced than that of the related art.

Figure 4:
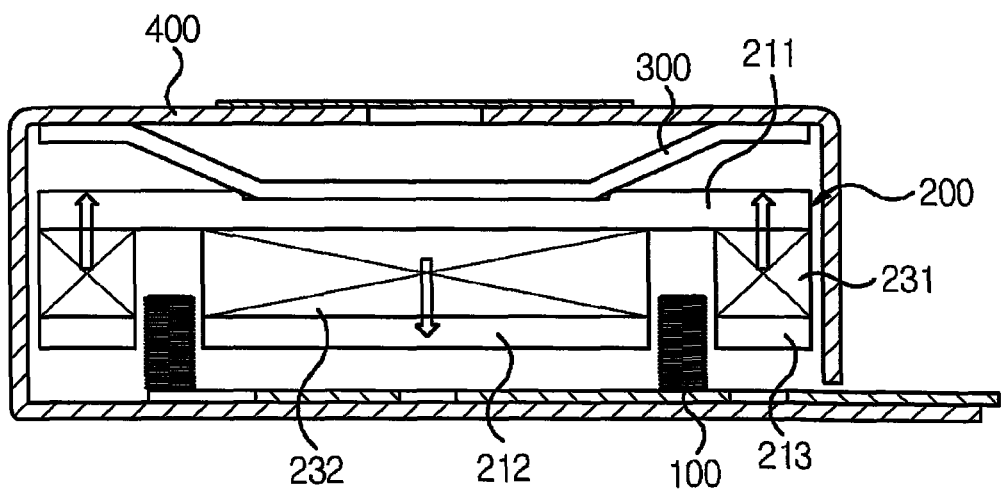
FIG. 4 is a lateral cross-sectional view of a linear vibrator according to an exemplary embodiment of the present disclosure.

FIG. 4 is a lateral cross-sectional view of a linear vibrator according to an exemplary embodiment of the present disclosure.

Referring to FIG. 4, a linear vibrator may comprise: a case 400 forming an exterior of the linear vibrator; a spring 300 formed inside an upper inner circumferential surface of the case 400; and an oscillator 200 resiliently formed underneath the spring 300. The oscillator 200 has a substantially rounded disk shape, and a magnet is formed at a bottom surface of the disk. The case 400 is formed at a floor thereof with a coil 100 distanced at a predetermined space from the oscillator 200. To be more specific, the oscillator 200 is formed with an inner magnet 232 at a central position thereof and an outer magnet 231 at a periphery.

The coil 100 formed underneath the case is horizontally interposed between the outer magnet 231 and the inner magnet 232. Because flux directions between inner surface and the outer surface of the coil 100 face each other, it is more effective to arrange the outer magnet 231 and the inner magnet 231 at an inner side and at an outer side of the coil 100 respectively.

The coil 100 is discretely arranged between the outer surface of the inner magnet 232 and the inner surface of the outer magnet 231, and in a case the coil 100 is applied with a current, the oscillator vertically moves in response to mutual electromagnet force between the magnets 232, 232 of the coil 100, and the spring 300 is vibrated in response to the elasticity.

It should be apparent that the magnets 231, 232 and the spring 300 may be arranged underneath the case 400 whereby the magnets can be directly supported by the spring 300 without being supported by the spring 300 through a magnetic body 210.

Furthermore, an upper plate 211 is interposed between the spring 300 and the magnets 231, 232 to replace a conventional yoke. Preferably, bottom plates 212, 213 may be formed at the bottom of the magnet. The plates 211, 212, 213, each having a predetermined mass, are formed at upper and bottom of the magnet 231, 232 to replace the conventional weight. If the magnet is comprised of the inner magnet 232 and the outer magnet 231, the bottom plate may include a doughnut-shaped bottom plate 212 formed at a bottom surface of the outer magnet 231 and the bottom plate 213 formed at a bottom surface of the inner magnet 232.

More preferably, the outer magnet 231 and the inner magnet 232 are so arranged as to have opposite directions of magnetic flux. This is because magnetic fluxes are oppositely formed at an inner side and the outer side of the coil, and thereby each polarity of the outer magnet 231 and the inner magnet 232 are oppositely formed to maximize the electromagnetic force. The magnetic fluxes of opposite directions are shown in arrows in FIG. 4.

As noted in FIG. 4, the magnetic flux of the inner magnet 232 is formed downward of the vibrator while that of the outer magnet 231 is formed upward of the vibrator, whereby an appropriate application of coil current direction may maximize the vibration. However, it should be apparent that the flux directions may be oppositely set up responsive to current direction and the rotational direction of the coil.

Meanwhile, as explained in the above, the plates 211, 212, 213 are used to replace the conventional weight and yoke in order to increase the flux. More preferably, the plates are formed with magnetic substance. Therefore, the plates are preferably made of silicon steel or malleable iron. It should be also appreciated that the plates may be selectively formed with materials capable of minimizing the flux leakage. As noted, because the plates are made of magnetic substance 210 to minimize magnetic flux leakage and yet to increase the amount of magnetic flux, the efficiency of electromagnetic force can be enhanced to further increase the vibrating force of the oscillator.

Now, the configuration of the upper plate 211 and the bottom plates 212, 213 will be further discussed. A back yoke portion functioning as the conventional frame of the vibrator is replaced by the upper plate 211. As a result, the upper plate 211 of magnetic substance is upwardly and resiliently supported by the spring 300 and inwardly supports the inner magnet 232 and the outer magnet 231.

Preferably, the oscillator is such that the bottom of the magnets 231, 232 is formed with magnetic substance. The outer magnet 231 and the inner magnet 232 are formed at the bottom thereof with the bottom plates 212, 213, and the bottom inner plate 212 formed at the bottom end of the inner magnet 232 takes the disk shape in cross-sectional view while the bottom outer plate 213 formed at the outer end of the outer magnet 231 takes the doughnut shape.

It should be also apparent that each of the bottom plates 212, 213 is formed at the upper distal end and the bottom distal end to enhance the magnetic flux efficiency even if the magnets are conventionally formed at an the outer side and the inner side without being separated.

Based on the concept in which magnetic substances are formed at the upper side and the bottom side of the magnet, the magnetic flux is not leaked from both ends of the magnet to the outside, and vertical vibration is solidly generated by the electromagnetic force between the coil and the magnets, whereby the vibrating efficiency can be further enhanced by the current applied in response to the arrangement.

Preferably, a cubic rate between the outer magnet 231 and the inner magnet 232 may be approximately 1. More preferably, the cubic rate between the outer magnet 231 and the inner magnet 232 is determined in the range of 0.8~1. It should be noted that the flux rate is equalized because of substantially equal cubic rate to further contribute to the flux efficiency and vibrating force.

The linear vibrator thus configured and thus conceived can generate approximately 20 g·f force whilst the conventional vibrator can generate approximately 2~3 g·force, whereby it can be noted that there is a quite of difference in vibrating force between the two vibrators.

Figure 5:
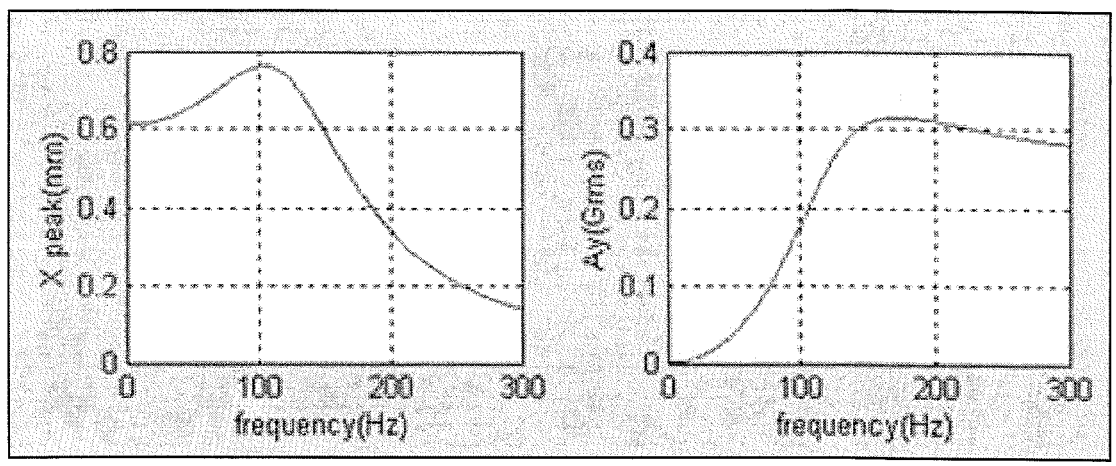
FIG. 5 is a graph illustrating a relationship between frequency of a linear vibrator, a distance of an oscillator and vibrating power according to an exemplary embodiment of the present disclosure.

FIG. 5 is a graph illustrating a relationship between frequency of a linear vibrator, a distance of an oscillator and vibrating force according to an exemplary embodiment of the present disclosure, where most of the use frequency is set up higher than the resonant frequency and vibrating force is increased according to the exemplary embodiment of the present disclosure.

In the experiment, $m_1$ is set up at 0.1 kg, $m_2$ is set up at 0.0008 kg, $k_1$ is set up at 11.3N/m, $k_2$ is set up at 1070N/m, $c_1$ is set up at 3.31 Ns/m, $c_2$ is set up at 0.6 Ns/m and F is set up at 0.35N.

The left hand side graph of FIG. 5 shows a moving distance of the oscillator responsive to frequency, where it should be noted that the resonant frequency is lowered at the approximate 100 Hz range, while the moving distance shows 0.4 mm and over at the approximate 200 Hz range near the resonant frequency.

The right hand side graph of FIG. 5 illustrates the vibration amount of the oscillator responsive to the frequency, where a peak value of the vibration amount at 100 Hz and over shows 0.2 G or more across the board, although the peak value has a bit reduced compared with that of the prior art. This means that there has been generated an effective vibration in the range of 100 Hz and over, and a user can detect vibrations of much broader frequency through the tactile impression of a finger touch.

Now, a mobile device formed at the linear vibrator according to the present disclosure will be described in detail.

Concomitant with recently increased interest in tactile impression which is one of the important faculties of perception along with the sense of sight and auditory sense, a device using the tactile impression comes to the fore, where a device using the tactile impression is called a haptic device. The haptic device is being used in various fields in mobile devices such as smart phones and portable PC, virtual reality, wearable computer and robotics. Communication, or interface, with a computer through a tactile method involving a device that senses body movement is called a haptic interface.

As explained in the foregoing with reference to disadvantages involved with the related art, a mobile device utilizing the linear vibrator also suffers from disadvantages in that various types of vibrations cannot be used due to limit in size and vibrating force. The broadband linear vibrator has been thus proposed to solve the aforementioned disadvantages according to the present disclosure.

A mobile device according to the present disclosure is provided, comprising: a display outputting an image; a touch pad receiving an execution command through a touch; and a vibrating unit providing a vibration output; a sound output unit outputting sound; and a controller outputting an image, a sound and a vibration control signal. The vibrating unit is the linear vibrator according to the present disclosure.

As described in the foregoing, the linear vibrator according to the present disclosure is so configured as to increase the vibrating force, to broaden the bandwidth from which the vibration is generated and to output various types of vibrations, whereby it should be apparent that bandwidth can be set up at a higher level. In a case the bandwidth is increased from several kHz to tens of several kHz, vibrations and sounds at higher levels and ranges can be outputted as well.

Now, a mobile device formed with a linear vibrator capable of outputting vibrations and sounds at the same time according to another concept of the present disclosure will be proposed. Based on the set-up, vibration and sound may be outputted at the same time or separately from the same linear vibrator.

In a case the size and output of the linear vibrator are to be increased, a sound output unit may be used as a replacement. As noted above, if a vibrator replaces a speaker functioning as a sound output unit, there is an advantage in that the mobile device can be simplified in structure and miniaturized.

In case of a mobile device formed with a linear vibrator capable of simultaneously outputting vibration and sound, a controller is preferably arranged to separately set up a vibration mode and a sound mode. In case of setting up a vibration mode, a frequency of approximately less than 300 Hz would be set up as a maximum use frequency, such that vibration output is detectable, and in case of setting up a sound mode, a sound is detectable if a frequency in the range of approximately 300 Hz to 15,000 Hz is used.

Furthermore, in a case a vibrating plate or a trembling plate is formed at an inner surface of the linear vibrator or the mobile device, the sound or vibration effect may be further increased, and the sound and the vibration may be simultaneously generated. Meanwhile, it should be appreciated that two or more linear vibrators may be arranged if necessary, although a single configuration may be also provided.

Based on the linear vibrator concept according to the present disclosure, a mobile device is provided that includes a linear vibrator whose frequency band to a maximum use frequency detectable as vibration and sound based on a resonant frequency is 1.2 times than a frequency band to a minimum use frequency. Therefore, the bandwidth of use frequency more than the resonant frequency is at least 1.2 times greater than the bandwidth of use frequency less than the resonant frequency, whereby various vibrations can be generated in comparison with the related art in which vibration was generated in a limited scope.

As a result, vibration frequency detectable in the range of 30 to 150 Hz before and after the resonant frequency can be generated. As noted from the foregoing, the resonant frequency is located at a comparably lower frequency scope in the actual use frequency, such that it should be noted that a use frequency area more than the resonant frequency is larger than a use frequency area less than the resonant frequency.

The broadband linear vibrator according to the present disclosure is advantageous in that the vibration band is conspicuously broadened compared to the related art linear vibrator, whereby user-detectable frequency scope is broadened to enable an experience of various types of vibrations. Another advantage is that in order to compensate the set-up of practical area of vibration frequency deviated from the resonant frequency area, a structure is proposed that is capable of providing a strong electromagnetic force to further increase the effect of broadband linear vibrator.

Although embodiments have been described with reference to a number of illustrative embodiments thereof, it should be understood that numerous other modifications and embodiments can be devised by those skilled in the art that will fall within the spirit and scope of the principles of this invention. More particularly, various variations and modifications are possible in the component parts and/or arrangements of the subject combination arrangement within the scope of the disclosure, the drawing and the appended claims. In addition to variations and modifications in the component parts and/or arrangements, alternative uses will also be apparent to those skilled in the art.

What is claimed is:

1. A broadband linear vibrator, comprising:
   a case;
   a spring coupled to the case;
   an oscillator including a magnet for elastically supporting the spring;
   a stator formed inside the case for vibrating the oscillator;
   an upper late formed between the spring and the magnet, wherein the magnet includes an outer magnet disposed at a periphery of the upper plate and an inner magnet that is centrally disposed; and
   a bottom plate formed at a bottom end of the magnet;
   wherein a frequency band to a maximum use frequency that is detectable as a vibration or a sound source based on a resonant frequency is 1.2 times larger than a frequency band to a minimum use frequency,
   wherein a use frequency is set up separately set up a vibration mode and a sound mode, and
   wherein each of the outer magnet and the inner magnet has an opposite polarity toward a vibrating direction of the oscillator.

2. The broadband linear vibrator of claim 1, wherein at least one of the upper plate and the bottom plate is formed with a magnetic substance.

3. The broadband linear vibrator of claim 1, wherein a cubic rate between the external magnet and the inner magnet is in the range of 0.8~1.

4. The broadband linear vibrator of claim 1, wherein the vibration mode is set up within the maximum use frequency of 300 Hz.

5. A broadband linear vibrator, comprising:
   a case;
   a spring coupled to the case;
   an oscillator including a magnet for elastically supporting the spring;
   a stator formed inside the case for vibrating the oscillator;
   an upper plate formed between the spring and the magnet, wherein the magnet includes an outer magnet disposed at a periphery of the upper plate and an inner magnet that is centrally disposed; and
   a bottom plate formed at a bottom end of the magnet;
   wherein the linear vibrator generates an oscillating frequency capable of detecting in the range of 30~150 Hz before and after resonant frequency,
   wherein each of the outer magnet and the inner magnet has an opposite polarity toward a vibrating direction of the oscillator.

6. The broadband linear vibrator of claim 5, wherein at least one of the upper plate and the bottom plate is formed with a magnetic substance.

7. The broadband linear vibrator of claim 5, wherein a cubic rate between the outer magnet and the inner magnet is in the range of 0.8~1.

* * * * *